United States Patent [19]
Watanabe et al.

[11] Patent Number: 5,460,738
[45] Date of Patent: Oct. 24, 1995

[54] MODIFIED STANNIC OXIDE-ZIRCONIUM OXIDE COMPOSITE SOL AND PROCESS FOR PREPARING THE SAME

[75] Inventors: Yoshitane Watanabe; Keitaro Suzuki, both of Funabashi; Tetsunori Matsukura, Sodegaura, all of Japan

[73] Assignee: Nissan Chemical Industries Ltd., Tokyo, Japan

[21] Appl. No.: 86,878

[22] Filed: Jul. 7, 1993

[30] Foreign Application Priority Data

Jul. 7, 1992 [JP] Japan ................................. 4-179869

[51] Int. Cl.⁶ ................................................. B01J 13/00
[52] U.S. Cl. .................. 252/313.1; 252/309; 106/286.4
[58] Field of Search ............................. 252/309, 313.1; 106/286.2, 286.4

[56] References Cited

U.S. PATENT DOCUMENTS

| | | | |
|---|---|---|---|
| 1,682,239 | 8/1928 | Patrick | 252/315.01 |
| 1,848,266 | 3/1932 | Patrick et al. | 252/315.01 |
| 4,571,365 | 2/1986 | Ashlock et al. | 106/287.12 |
| 5,094,691 | 3/1992 | Watanabe et al. | 106/286.4 |
| 5,165,992 | 11/1992 | Yajima | 428/323 |
| 5,188,667 | 2/1993 | Watanabe et al. | 106/286.4 |
| 5,366,545 | 11/1994 | Yajima et al. | 106/286.4 |

FOREIGN PATENT DOCUMENTS

| | | |
|---|---|---|
| 4035418 | 5/1991 | Germany. |
| 2-48418 | 2/1990 | Japan. |

OTHER PUBLICATIONS

Database WPI, Derwent Publications Ltd., AN 80–33510C, JP–A–55 047 137, Apr. 4, 1980.

*Primary Examiner*—Shean Wu
*Attorney, Agent, or Firm*—Oblon, Spivak, McClelland, Maier, & Neustadt

[57] ABSTRACT

A stable sol which comprises colloidal particles of modified stannic oxide-zirconium oxide composite having a particle size of from 4.5 to 60 nm, said colloidal particles consisting essentially of, as nuclei, colloidal particles of stannic oxide-zirconium oxide composite having a particle size of from 4 to 50 nm and having a structure in which colloidal particles of stannic oxide and colloidal particles of zirconium oxide are bonded to each other in a ratio, by weight of these oxides, of from 0.02 to 1.0 as $ZrO_2/SnO_2$, and, as a coating on the surface of the nuclei, colloidal particles of tungstic oxide-stannic oxide composite having a particles size of from 2 to 7 nm and a $WO_3/SnO_2$ weight ratio of from 0.5 to 100, and which has a total content of metal oxides of from 2 to 50 wt %.

25 Claims, No Drawings

5,460,738

MODIFIED STANNIC OXIDE-ZIRCONIUM OXIDE COMPOSITE SOL AND PROCESS FOR PREPARING THE SAME

BACKGROUND OF THE INVENTION

1. Field of the Invention

The present invention relates to an improvement of a sol of modified colloidal particles having a particle size of from 4.5 to 60 nm, formed by coating the surface of metal oxide colloidal particles with colloidal particles of tungstic oxide-stannic oxide composite having a particle size of from 2 to 7 nm. The sol of the present invention is useful as a component of a hard coat agent to be applied on the surface of plastic lenses and for various other applications.

2. Description of the BAckground

Heretofore, various sols of metal oxides have been known. A sol of a metal oxide having a high refractive index is used as a component of a hard coat agent to be applied on the surface of plastic lenses for the purpose of improving the surface of such plastic lenses which have been widely used in recent years.

For example, Japanese Examined Patent Publication No. 37142/1988 discloses a hard coat agent containing from 1 to 300 nm particles of an oxide of metal such as Al, Ti, Zr, Sn or Sb.

Japanese Examined Patent Publication No. 40119/1975 proposes a silicic acid-stannic acid composite sol wherein the molar ratio of Si:Sn is from 2:1 to 1,000:1.

A sol of tungstic oxide alone which is stable for more than one hour, has not yet been known, but Japanese Unexamined Patent Publication No. 52686/1979 proposes a sol of $WO_3:SiO_2:M_2O$ wherein M is an alkali metal atom or an ammonium group in a molar ratio of 4–15:2–5:1 which is obtained by an addition of a silicate.

Japanese Unexamined Patent Publication No. 151038/1991 discloses a sol of tungstic oxide-stannic oxide composite. This sol contains tungstic oxide and stannic oxide in a $WO_3/SnO_2$ weight ratio of from 2 to 100 and contains $M_2O$ wherein M is an alkali metal atom, an ammonium group or an amine molecule in a molar ratio of from 0.02 to 0.7 to the sum of $WO_3$ and $SnO_2$.

Japanese Unexamined Patent Publication No. 217230/1991 proposes a stable sol which comprises colloidal particles of modified metal oxide having a particle size of from 4.5 to 60 nm and formed by coating colloidal particles of tungstic oxide-stannic oxide composite having a particle size of from 2 to 7 nm and a $WO_3/SnO_2$ weight ratio of from 0.5 to 100 on the surface of colloidal particles of trivalent, tetravalent or pentavalent metal oxide having a particle size of from 4 to 50 nm as nuclei, and which has a total content of such metal oxides of from 2 to 50 wt %.

However, when these conventional metal oxide sols, particularly cationic metal oxide sols, are used as components of hard coat agents, not only the stability of the hard coat agents thereby obtained, will be inadequate, but also the transparency, the adhesion properties or the weather resistance of the cured coating films of such hard coat agents, will be inadequate.

When a $Sb_2O_5$ sol is used as a component of a hard coat agent, if the refractive index of the plastic base material of the lens is 1.6 or more, adequate improvement in the refractive index of the cured coating film can no longer be expected with this $Sb_2O_5$ sol, since the refractive index of $Sb_2O_5$ is at a level of from 1.65 to 1.70.

The sol of tungstic oxide disclosed in the above-mentioned Japanese Unexamined Patent Publication No. 52686/1979, is obtained by adding a silicate to an aqueous solution of tungstic acid obtained by subjecting an aqueous solution of a tungstate to cation-removing treatment, but it is stable only under a strongly acidic condition. Further, even if this is used as a component of a hard coat agent, no substantial effects for improving the refractive index of the coating film will be obtained.

The silicic acid-stannic acid composite sol disclosed in the above-mentioned Japanese Examined Patent Publication No. 40119/1975, is obtained by subjecting an aqueous solution of a mixture comprising an alkali metal silicate and an alkali metal stannate to cation-removing treatment. However, like in the above case, even if this sol is used as a component of a hard coat agent, no substantial effects for improving the refractive index of the coating film will be obtained.

The colloidal particles of the tungstic oxide-stannic oxide composite sol disclosed in the above Japanese Unexamined Patent Publication No. 151038/1991 have a refractive index of from 1.8 to 1.9, and a hard coat film containing them is excellent in the scratch resistance, the transparency and the adhesion property, but its water resistance is inadequate.

The colloidal particles of the modified metal oxide sol disclosed in the above-mentioned Japanese Unexamined Patent Publication No. 217230/1991 have a refractive index of at least 1.7, and when this sol is used as a component of a hard coat agent for a plastic lens, it is possible to substantially satisfy the properties required for a hard coat film such as the scratch resistance, transparency, the adhesion property, the water resistance and the weather resistance. However, when the nuclei of such modified metal oxide colloidal particles are a stannic oxide sol, a hard coat film obtained by using such a sol, is susceptible to yellowing when exposed to ultraviolet rays.

SUMMARY OF THE INVENTION

It is an object of the present invention to provide a stable sol of colloidal particles which undergo no coloring even when exposed to ultraviolet rays and which have a high refractive index, as a sol of colloidal particles of the type which are obtainable by coating colloidal particles as nuclei with colloidal particles of tungstic oxide-stannic oxide composite, and a process for its preparation.

The sol of the present invention is a stable sol which comprises colloidal particles of modified stannic oxide-zirconium oxide composite having a particle size of from 4.5 to 60 nm, said colloidal particles consisting essentially of, as nuclei, colloidal particles of stannic oxide-zirconium oxide composite having a particle size of from 4 to 50 nm and having a structure in which colloidal particles of stannic oxide and colloidal particles of zirconium oxide are bonded to each other in a ratio, by weight of these oxides, of from 0.02 to 1.0 as $ZrO_2/SnO_2$, and, as a coating on the surface of the nuclei, colloidal particles of tungstic oxide-stannic oxide composite having a particles size of from 2 to 7 nm and a $WO_3/SnO_2$ weight ratio of from 0.5 to 100, and which has a total content of metal oxides of from 2 to 50 wt %.

DETAILED DESCRIPTION OF THE PREFERRED EMBODIMENT

The process for producing the sol of the present invention comprises the following steps (a), (b), (c) and (d):

(a) a step of mixing an aqueous sol of stannic oxide containing colloidal particles of stannic oxide having a particle size of from 4 to 50 nm at a concentration of from 0.5 to 50 wt % as the oxide $SnO_2$, and an aqueous solution containing an oxyzirconium salt at a concentration of from 0.5 to 50 wt % as $ZrO_2$, in a weight ratio of from 0.02 to 1.0 as $ZrO_2/SnO_2$ derived therefrom;

(b) a step of heating the mixed solution obtained in the step (a) at a temperature of from 60° to 200° C. for from 0.1 to 50 hours to form an aqueous sol of stannic oxide-zirconium oxide composite having a particle size of from 4.5 to 60 nm;

(c) a step of mixing the aqueous sol of stannic oxide-zirconium oxide composite obtained in the step (b) in an amount of 100 parts by weight, as the sum of $ZrO_2$ and $SnO_2$ contained therein, and a sol of tungstic oxide-stannic oxide composite having a particle size of from 2 to 7 nm and a $WO_3/SnO_2$ weight ratio of from 0.5 to 100, in an amount of from 2 to 100 parts by weight, as the sum of $WO_3$ and $SnO_2$ contained therein, at a temperature of from 0° to 100° C. to form an aqueous sol of modified stannic oxide-zirconium oxide composite having a particle size of from 4.5 to 60 nm; and (d) a step of contacting the aqueous sol of modified stannic oxide-zirconium oxide composite obtained in the step (c) to an anion exchanger to remove anions present in said sol.

Now, the present invention will be described in detail with reference to the preferred embodiments.

The aqueous sol of tungstic oxide-stannic oxide composite to be used for the preparation of the sol of the present invention and the method for its production, may be conventional ones and may, for example, be those disclosed in the above-mentioned Japanese Unexamined Patent Publication No. 217230/1991. The concentration of this tungstic oxide-stannic oxide composite sol is preferably at least 1 wt %, more preferably from 10 to 30 wt %. The preferred aqueous sol of tungstic oxide-stannic oxide composite usually shows a pH of from 1 to 9 and is a colorless transparent or substantially transparent liquid. It is stable at least three months at room temperature and at least one month at 60° C., and no precipitates will be formed in this sol. Further, this sol is free from gelation or increasing viscosity.

The sol of colloidal particles of stannic oxide-zirconium oxide composite as nuclei to be used for the preparation of the sol of the present invention, can be obtained by the method comprising the above steps (a) and (b).

The colloidal particles of stannic oxide to be used for the step (a) can readily be prepared in the form of a sol of colloidal particles having a particle size of about 4 to 50 nm by a conventional method such as an ion exchange method, a peptization method, a hydrolysis method or a reaction method.

The above ion exchange method may, for example, be a method wherein a stannate such as sodium stannate is treated by a hydrogen-type cation exchange resin, or a method wherein a stannic salt such as stannic chloride or stannic nitrate is treated with a hydroxyl group type anion exchange resin. The above peptization method may, for example, be a method wherein a stannic hydroxide gel obtained by neutralizing a stannic salt with a base or by neutralizing stannic acid with hydrochloric acid, is washed and then peptized by an acid or by a base. The above hydrolysis method may, for example, be a method wherein a tin alkoxide is hydrolyzed, or a method wherein a basic salt such as basic stannic chloride is hydrolyzed under heating, followed by removing the unnecessary acid. The above reaction method may, for example, be a method wherein metal tin powder and an acid are reacted.

The dispersed medium for this stannic oxide sol may be water or a hydrophilic organic solvent. However, an aqueous sol is preferred wherein the dispersed medium is water. A preferred aqueous sol of stannic oxide is the stable one showing a pH at a level of from 0.2 to 11. The stable aqueous sol of stannic oxide may, for example, be an alkaline sol stabilized with an organic base such as an amine. So long as the object of the present invention can be accomplished, an optional component such as an alkaline substance, an acidic substance or an oxycarboxylic acid for stabilizing the sol, may be contained in the stannic oxide sol. The concentration of the stannic oxide sol to be used, may be at a level of from 0.5 to 50 wt % as stannic oxide. However, the lower the concentration, the better, and the concentration is preferably from 1 to 30 wt %.

The oxyzirconium salt to be used in the step (a), may, for example, be zirconium oxychloride, zirconium oxynitrate, zirconium oxysulfate, zirconium oxycarbonate, or a zirconium oxyorganic acid such as zirconium oxyacetate. Such an oxyzirconium salt may be used in a solid form or in the form of an aqueous solution. However, it is preferred to use it in the form of an aqueous solution containing from 0.5 to 30 wt % of $ZrO_2$. A salt which is insoluble in water, such as zirconium oxycarbonate, may also be used in a case where the stannic oxide aqueous sol to be mixed therewith is an acidic sol.

The mixing of the stannic oxide aqueous sol and the oxyzirconium salt in the step (a) can be conducted at a temperature of from 0° to 100° C., preferably from room temperature to 60° C., under stirring. The mixing may be conducted by adding the oxyzirconium salt to the stannic oxide aqueous sol or by adding the stannic oxide sol to the aqueous solution of the oxyzirconium salt. However, the latter is preferred. The mixing must be thoroughly conducted, and this can be accomplished preferably by conducting the above stirring for from 0.5 to 3 hours. It is preferred to mix the stannic oxide aqueous sol and the oxyzirconium salt in a $ZrO_2/SnO_2$ weight ratio of from 0.02 to 1.0. Further, it is preferred to conduct the mixing so that the liquid after mixing will have a total content of $ZrO_2$ and $SnO_2$ of from 0.5 to 30 wt %.

In the step (b), the mixed solution obtained in the above step (a) is heated at a temperature of from 60° to 200° C. for from 0.1 to 50 hours. By this step (b), the aqueous sol of stannic oxide-zirconium oxide composite to be used for the preparation of the sol of the present invention, will be obtained.

The sol of composite colloidal particles of stannic oxide-zirconium oxide modified by colloidal particles of tungstic oxide-stannic oxide composite, of the present invention, can be prepared by the further steps (c) and (d) from this aqueous sol of stannic oxide-zirconium oxide composite and the aqueous sol of tungstic oxide-stannic oxide composite.

In the step (c), this stannic oxide-zirconium oxide composite sol in an amount of 100 parts by weight as the metal oxides (the sum of the $ZrO_2$ content and the $SnO_2$ content) and the above-mentioned tungstic oxide-stannic oxide composite sol in an amount of from 2 to 10 parts by weight as the metal oxides (the sum of the $WO_3$ content and the $SnO_2$ content) are mixed, preferably under forcible stirring.

The mixing in the step (c) is preferably conducted at a temperature of from 0° to 100° C., more preferably from room temperature to 60° C. This mixing can be completed in from about 5 to 60 minutes. Further, in this mixing, the concentration and the amount of the above tungstic oxide-stannic oxide composite sol and the concentration and the amount of the stannic oxide-zirconium oxide composite sol are adjusted, so that the sol of modified colloidal particles thereby obtained, will contain a total of the $ZrO_2$ content, the $SnO_2$ content, the $WO_3$ content and the $SnO_2$ content of from 2 to 40 wt %.

The modified colloidal particles formed by the mixing in the step (c) can be observed by an electron microscope and have a particle size of from about 4.5 to 60 nm. The sol obtained by the above mixing will have a pH of from about 1 to 9, but it contains a substantial amount of anions such as chloride ions, nitrate ions or acetate ions derived from the oxyzirconium salt used in the step (a), and its transparency is also low.

In the step (d), anions will be removed from the sol obtained in the step (c). This removal of anions can be conducted by contacting the sol in a desirable concentration such as from 1 to 10 wt % to an anion exchanger. As the anion exchanger, a hydroxyl group type anion exchange resin, for example, a strongly basic hydroxyl group type anion exchange resin such as Amberlite 410 as a commercial product, is preferred. For the removal of anions by contacting the sol to an anion exchanger, a method is preferred in which the sol maintained at a temperature of not higher than 100° C., preferably from room temperature to 60° C., is passed through a column of the above anion exchange resin.

By the removal of anions in the step (d), it is possible to obtain an aqueous sol of modified stannic oxide-zirconium oxide composite of the present invention having a pH of from 3 to 11 and having good transparency and adequate stability.

When it is desired to further increase the concentration of the sol obtained in the step (d), the sol can be concentrated by a conventional method such as an evaporation method or an ultrafiltration method to the maximum concentration of about 50 wt %. Further, when it is desired to adjust the pH of the sol, such adjustment can be conducted by adding a hydroxide of e.g. an alkali metal or ammonium, an amine or an oxycarboxylic acid to the sol after the concentration. A sol wherein the total content of metal oxides is from 10 to 40 wt %, is particularly practically useful.

An organo sol can be obtained by substituting the aqueous medium of the aqueous sol obtained in the above step (d) or in a step subsequent thereto by a hydrophilic organic solvent. Such substitution can be conducted by a conventional method such as an evaporation method or an ultrafiltration method. The hydrophilic organic solvent may, for example, be a lower alcohol such as methyl alcohol, ethyl alcohol or isopropyl alcohol; a linear amide such as dimethylformamide or N,N'-dimethylacetamide; a cyclic amide such as N-methyl-2-pyrrolidone; or a glycol such as ethyl cellosolve or ethylene glycol.

When irradiated with ultraviolet rays, stannic oxide is reduced to stannous oxide which exhibits a brown color or a bluish green color. Surprisingly, however, colloidal particles of the composite of stannic oxide and zirconium oxide do not undergo such color change even when irradiated with ultraviolet rays. Such surprising effects are believed to be attributable to the structure of the colloidal particles of the composite of stannic oxide and zirconium oxide.

When the mixture of the stannic oxide sol and the aqueous solution of an oxyzirconium salt, is heated at a temperature of from 60° to 200° C., the oxyzirconium salt will be hydrolyzed to form fine zirconium oxide colloidal particles having a particle size of not more than a few nm. The formed fine colloidal particles of zirconium oxide will be bonded to the colloidal particles of the stannic oxide sol, to form colloidal particles of a composite of the stannic oxide and zirconium oxide, as nuclei to be used for the preparation of the sol of the present invention. This bond is a bond of a Sn atom and a Zr atom via an oxygen atom, i.e. a bond represented by —Sn—O—Zr—O—Sn—. Therefore, it is considered that even when the colloidal particles of the composite of stannic oxide and zirconium oxide are irradiated with ultraviolet rays, the reduction of the stannic oxide to stannous oxide which causes coloring of the particles, will be substantially suppressed, whereby coloring of the particles scarcely occurs.

However, if the temperature for heating the mixture of the stannic oxide sol and the aqueous solution of the oxyzirconium salt, is higher than 200° C., flocculated particles having a particle size of 100 nm or larger are likely to form. On the other hand, if this heating temperature is lower than 60° C., the above-mentioned hydrolysis tends to hardly proceed. And also when the heating time is shorter than 0.1 hour, desired colloidal particles of a composite of stannic oxide and zirconium oxide tend to hardly form. It is unnecessary to continue this heating for more than 50 hours, and the production efficiency of the sol will thereby be lowered.

The ratio of the $ZrO_2$ content to the $SnO_2$ content in the mixture of the stannic oxide sol and the aqueous solution of the oxyzirconium salt, is also important. If the $ZrO_2/SnO_2$ weight ratio is less than 0.02, the ratio of the number of fine colloidal particles of zirconium oxide bonded to the colloidal particles of stannic oxide will be small, and the formed composite colloidal particles are likely to undergo coloring when irradiated with ultraviolet rays. It is important that this $ZrO_2/SnO_2$ weight ratio is larger than 0.02, but even if it is increased beyond 1.0, no further improvement in the effects will be obtained. The stannic oxide-zirconium oxide composite sol to be used in the present invention preferably has adequate stability. Such a sol tends to be unstable when the particle size of this composite colloidal particles is less than 4 nm, the pH of the composite sol is lower than 0.1, or when the concentration of the sum of stannic oxide and zirconium oxide in the composite sol is 50 wt % or higher.

Further, if the pH of the sol is 12 or higher, the stannic oxide component in the composite colloidal particles tends to dissolve into the liquid, such being undesirable. A composite sol wherein the concentration of the sum of stannic oxide and zirconium oxide is less than 0.5 wt %, is not practical as an industrial product except for a case where such a sol is specifically desired.

The colloidal particles of stannic oxide-zirconium oxide composite is positively charged, while the colloidal particles of tungstic oxide-stannic oxide composite is negatively charged. Accordingly, in the step (c) the negatively charged colloidal particles of tungstic oxide-stannic oxide composite are electrically attracted to the circumference of the positively charged colloidal particles of stannic oxide-zirconium oxide composite, whereupon the colloidal particles of tungstic oxide-stannic oxide composite will be bonded by a chemical bond to the surface of the positively charged colloidal particles as nuclei. It is considered that the surface of the positively charged nuclei particles will be covered by the tungstic oxide-stannic oxide composite to form the colloidal particles of modified stannic oxide-zirconium oxide composite. It is believed that the fact that the colloidal particles of modified stannic oxide-zirconium oxide composite with the surface covered by the colloidal particles of tungstic oxide-stannic oxide composite according to the present invention are negatively charged in the sol, is attributable to such a particle formation mechanism.

However, at the time of mixing in the step (c), if the total amount of the $WO_3$ content and the $SnO_2$ content derived from the sol of a mixing component is less than 2 parts by weight per 100 parts by weight of the total amount of the $ZrO_2$ content and the $SnO_2$ content derived from the sol of the other mixing component, the modified sol tends to be poor in the stability. This is believed to be attributable to the fact that the coating on the nuclei surface of the colloidal particles of the stannic oxide-zirconium oxide composite by the colloidal particles of tungstic oxide-stannic oxide composite will be inadequate, whereby flocculation of the formed colloidal particles is likely to take place, and thus the formed sol tends to be unstable. Accordingly, the amount of the colloidal particles of tungstic oxide-stannic oxide composite to be mixed, may be smaller than the amount required to cover the entire surface of the nuclei particles, but must be at a level of at least the minimum amount required to form a stable sol of modified particles. If the colloidal particles of tungstic oxide-stannic oxide composite are used for the above mixing in an amount exceeding the amount required for such surface coating, the resulting sol will be nothing more than a stable mixed sol comprising the sol of the colloidal particles of tungstic oxide-stannic oxide composite and the sol of the formed colloidal particles of modified stannic oxide-zirconium oxide composite. Accordingly, the total amount of the $WO_3$ content and $SnO_2$ content from the colloidal particles of tungstic oxide-stannic oxide composite to be used, is preferably not more than 100 parts by weight per 100 parts by weight of the total amount of the $ZrO_2$ content and the $SnO_2$ content from the nuclei particles.

The aqueous sol of modified stannic oxide-zirconium oxide composite of the present invention preferably has a pH of from 1 to 9. If the pH of this sol is lower than 1, such a sol tends to be unstable. On the other hand, if the pH of this sol exceeds 9, the tungstic oxide-stannic oxide composite covering the nuclei particles tends to dissolve in the liquid. Further, if the total content of metal oxides in the modified sol exceeds 50 wt %, such a sol is likely to be unstable. The concentration preferred for an industrial product is at a level of from 10 to 40 wt %.

The colloidal particles of tungstic oxide-stannic oxide composite are susceptible to hydrolysis at a high temperature. Therefore, the liquid temperature is maintained at a level of not higher than 100° C., preferably not higher than 60° C., during the mixing in the step (c), during the anion exchange treatment in the step (d) and at the time of concentration, pH adjustment and solvent substitution subsequent to the step (d).

Now, the present invention will be described in further detail. However, it should be understood that the present invention is by no means restricted by such specific Examples.

EXAMPLE 1

In this Example, a stannic oxide sol to be used for the preparation of the sol of the present invention, was prepared.

200 g of an aqueous sol of stannic oxide obtained by the reaction of metal tin powder, an aqueous hydrochloric acid solution and an aqueous hydrogen peroxide solution and having a specific gravity of 1.420, a pH of 0.40, a viscosity immediately after stirring of 32 mPa.s, a $SnO_2$ content of 33.0 wt %, a HCl content of 2.56 wt %, a particle size of the spindle-shaped colloidal particles observed by an electron microscope of not more than 10 nm, a specific surface area of the particles by a BET method of 120 $m^2/g$, a particle size calculated from this specific surface area of 7.2 nm, a dynamic light scattering method particle size by $N_4$ device by Coulter Electronics Inc. of USA of 107 nm, and a transparent slightly yellow color, was dispersed in 1,800 g of water to obtain a diluted sol.

Then, to the entire amount of this diluted sol, 0.8 g of isopropylamine was added. Then, the obtained liquid was passed through a column packed with a hydroxyl group type anion exchange resin to obtain 2,240 g of an aqueous alkaline sol of stannic oxide. This aqueous alkaline sol of stannic oxide was stable, and although it had a colloidal color, the transparency was very high, and it had a specific gravity of 1,029, a pH of 9.80, a viscosity of 1.4 Mpa.s, a $SnO_2$ content of 2.95 wt % and an isopropylamine content of 0.036 wt %.

EXAMPLE 2

In this Example, an aqueous sol of tungstic oxide-stannic oxide composite to be used for the preparation of the sol of the present invention, was prepared.

240 g of sodium tungstate ($Na_2WO_4.2H_2O$) was dissolved in 3,200 g of water to obtain 3,440 g of an aqueous solution of sodium tungstate having a $WO_3$ content of 4.88 wt %.

Then, this aqueous solution was passed through a column packed with a hydrogen-type cation exchange resin to obtain 4,450 g of an aqueous solution of tungstic acid (specific gravity: 1.033, pH: 1.53).

366 g of a separately prepared aqueous solution of sodium stannate ($Na_2SnO_3$) having a $SnO_2$ content of 15.0 wt %, was mixed with 3,440 g of the above aqueous solution of tungstic acid to obtain 3,806 g of an aqueous sol (I) of tungstic oxide-stannic oxide composite. This sol (I) had a specific gravity of 1.042 and a pH of 7.02.

Then, this sol (I) was passed through a column of a hydrogen-type cation exchange resin to obtain 5,860 g of an acidic aqueous sol of tungstic oxide-stannic oxide composite. This sol had a specific gravity of 1.032, a pH of 1.82, a $WO_3$ content of 2.87 wt %, a $SnO_2$ content of 0.94 wt % and a $WO_3/SnO_2$ weight ratio of 3.07.

To 5,860 g of this acidic aqueous sol (I) of tungstic oxide-stannic oxide composite, 413 g of the above-mentioned aqueous solution of sodium stannate was mixed to obtain 6,273 g of an aqueous sol (II) of tungstic oxide-stannic oxide composite. This sol had a specific gravity of 1.044 and a pH of 7.26.

Then, this sol (II) was passed through a column packed with a hydrogen-type cation exchange resin to obtain 7,566 g of an acidic aqueous sol (II) of tungstic oxide-stannic oxide composite. This sol had a specific gravity of 1.032, a pH of 2.07, a $WO_3$ content of 2.22 wt %, a $SnO_2$ content of 1.55 wt % and a $WO_3/SnO_2$ weight ratio of 1.44.

To 7,566 g of this acidic aqueous sol (II) of tungstic oxide-stannic oxide composite, 455 g of the above aqueous solution of sodium stannate was mixed to obtain 8,001 g of an aqueous sol (III) of tungstic oxide-stannic oxide composite. This sol (III) has a specific gravity of 1,040 and a pH of 7.56.

Then, to this sol, 22,000 g of water was added to obtain a diluted sol. This diluted sol was passed through a column packed with a hydrogen-type cation exchange resin to obtain an acidic aqueous sol (III) of tungstic oxide-stannic oxide composite. This sol had a specific gravity of 1.013, a pH of 2.61, a viscosity of 1.5 Mpa.s, a $WO_3$ content of 0.77 wt %, a $SnO_2$ content of 0.85 wt % and a $WO_3/SnO_2$ weight ratio of 0.92.

EXAMPLE 3

Step (a)

Zirconium oxychloride ($ZrOCl_2 8H_2O$) of reagent grade was dissolved in water to obtain an aqueous zirconium oxychloride solution having a $ZrO_2$ content of 1.0 wt %. To 3,410 g (100.6 g as $SnO_2$) of the aqueous alkaline sol of stannic oxide prepared in Example 1, 300 g of the above aqueous solution of zirconium oxychloride was added at room temperature under stirring, and the stirring was continued for one hour to obtain a mixed solution having a $ZrO_2/SnO_2$ weight ratio of 0.03 and a pH of 3.23.

Step (b)

The mixed solution obtained in the step (a) was heated at 85° C. for 3 hours under stirring to obtain 3,710 g of an aqueous sol of stannic oxide-zirconium oxide composite. This sol had a $SnO_2$ content of 2.71 wt %, a $ZrO_2$ content of 0.081 wt % and a pH of 2.82.

Step (c)

To 1,920 g (sum of $WO_3$ and $SnO_2$: 31.1 g) of the acidic aqueous sol (III) of tungstic oxide-stannic oxide composite prepared in Example 2, 3,710 g of the aqueous sol of stannic oxide-zirconium oxide composite obtained in the above step (b) was added at room temperature under stirring over a period of 15 minutes, and the stirring was further continued for 30 minutes to obtain an aqueous sol having white turbidity.

This sol having white turbidity had a total amount of metal oxides of 2.39 wt % and a pH of 2.75.

Step (d)

5,630 g of the aqueous sol having white turbidity obtained in the step (c) was passed through a column packed with a hydroxyl group type anion exchange resin Amberlite 410 at room temperature to obtain 6,450 g of an aqueous sol of modified stannic oxide-zirconium oxide composite. This sol had a total content of metal oxides of 2.08 wt % and a pH of 8.42, and although it had a colloidal color, the transparency was good.

Step (e)

The aqueous sol of modified stannic oxide-zirconium oxide composite obtained in the step (d) was concentrated at room temperature by a concentration apparatus equipped with an ultrafiltration filter with a fractional molecular weight of 50,000, to obtain 820 g of a highly concentrated aqueous sol of modified stannic oxide-zirconium oxide composite. This sol was a stable sol having a specific gravity of 1.17, a pH of 8.20, a viscosity of 3.0 Mpa.s and a total content of metal oxides of 16.3 wt %.

Step (f)

To 820 g of the above highly concentrated aqueous sol of modified stannic oxide-zirconium oxide composite, 2.7 g of tartaric acid, 3.7 g of diisobutylamine and one drop of a defoaming agent (SN Defoamer 483, San Nopco Limited) were added at room temperature under stirring, and the stirring was continued for one hour to obtain an adjusted sol having a pH of 7.02.

This adjusted sol was introduced into a rotary evaporator, and while 10 l of methanol was gradually added thereto under reduced pressure at a liquid temperature of not higher than 30° C., water was distilled off from the sol to obtain 440 g of a methanol sol of modified stannic oxide-zirconium oxide composite.

The sol obtained in the above step (f) had a specific gravity of 1.088, a viscosity of 4.3 Mpa.s, a total content of metal oxides of 30.4 wt %, a water content of 1.2 wt %, a pH of 7.94 when mixed with the equal amount by weight of water, and a particle size of from 10 to 15 nm as observed by an electron microscope. And, it had a colloidal color and high transparency. It was stable without any abnormality such as formation of precipitates, white turbidity or an increase of the viscosity even after being left for three months at room temperature. The refractive index of the dry product of this sol was 1.78.

EXAMPLE 4

Step (a)

Zirconium oxychloride ($ZrOCl_2.8H_2O$) of reagent grade was dissolved in water to obtain an aqueous solution of zirconium oxychloride having a $ZrO_2$ content of 2.0 wt %.

To 2,155 g of this aqueous solution of zirconium oxychloride, 9,735 g (287 g as $SnO_2$) of the aqueous alkaline sol of stannic oxide prepared in Example 1 was added at room temperature under stirring, and the stirring was continued for two hours to obtain a mixed solution having a $ZrO_2/SnO_2$ weight ratio of 0.15 and a pH of 1.50. This mixed solution had a colloidal color, and the transparency was good.

Step (b)

The mixed solution obtained in the step (a) was heated at 90° C. for 5 hours under stirring to obtain 11,890 g of an aqueous sol of stannic oxide-zirconium oxide composite.

This sol had a $SnO_2$ content of 2.41 wt %, a $ZrO_2$ content of 0.36 wt % and a pH of 1.45. Although it had a colloidal color, the transparency was good.

Step (c)

To 6,110 g of the acidic aqueous sol (III) of tungstic oxide-stannic oxide composite prepared in Example 2, 11,890 g of the aqueous sol of stannic oxide-zirconium oxide composite obtained in the above step (b) was added at room temperature under stirring over a period of 20 minutes, and the stirring was further continued for 30 minutes to obtain an aqueous sol having white turbidity, a pH of 1.45 and having a total content of metal oxides of 2.38 wt %.

Step (d)

18,000 g of the aqueous sol having white turbidity obtained in the step (c) was passed through a column packed with a hydroxyl group type anion exchange resin Amberlite 410 at room temperature to obtain 21,000 g of an aqueous sol of modified stannic oxide-zirconium oxide composite. This sol had a total content of metal oxides of 2.04 wt % and a pH of 9.00. Although it had a colloidal color, the transparency was good.

Step (e)

The aqueous sol of modified stannic oxide-zirconium oxide composite obtained in the step (d) was concentrated in the same manner as in Example 3 to obtain 1,810 g of a highly concentrated aqueous sol of modified stannic oxide-zirconium oxide composite. This sol was a stable sol having a specific gravity of 1.260, a pH of 8.18, a viscosity of 24.0 Mpa.s and a total content of metal oxides of 23.6 wt %.

Step (f)

To 465 g of the highly concentrated aqueous sol of modified stannic oxide-zirconium oxide composite obtained in the above step (e), 2.2 g of tartaric acid, 3.3 g of diisobutylamine and one drop of a defoaming agent (SN Defoamer 483, San Nopco Limited) were added at room temperature under stirring, and the stirring was continued for one hour to obtain an adjusted sol having a pH of 8.22.

This adjusted sol was introduced into a rotary evaporator, and while 9 l of methanol was gradually added thereto under reduced pressure at a liquid temperature of not higher than 30° C., water was distilled off from the sol to obtain 348 g of a methanol sol of modified stannic oxide-zirconium oxide composite.

The sol obtained in the above step (f) had a specific gravity of 1.103, a viscosity of 3.2 Mpa.s, a total content of metal oxides of 31.5 wt %, a water content of 0.62 wt %, a pH of 7.90 when mixed with the equal amount by weight of water, and a particle size of from 10 to 15 nm as observed by an electron microscope. This sol had a colloidal color and high transparency, and it was stable without any abnormality such as formation of precipitates, white turbidity or an increase of the viscosity even after being left at room temperature for three months. The refractive index of a dried product of this sol was 1.79.

EXAMPLE 5

Step (a)

In the same manner as in the step (a) of Example 3, an aqueous solution of zirconium oxychloride was prepared.

To 2,660 g of this aqueous solution of zirconium oxychloride, 9,015 g of the aqueous alkaline sol of stannic oxide prepared in Example 1 was added at room temperature under stirring, and the stirring was continued for two hours to obtain a mixed solution having a $ZrO_2/SnO_2$ weight ratio of 0.10 and a pH of 2.14. This mixed solution had a colloidal color, but the transparency was good.

Step (b)

The mixed solution prepared in the step (a) was heated at 85° C. for 5 hours under stirring to obtain 11,675 g of an aqueous sol of stannic oxide-zirconium oxide composite. This sol had a $SnO_2$ content of 2.28 wt %, a $ZrO_2$ content of 0.23 wt % and a pH of 1.80, and although it had a colloidal color, the transparency was good.

Step (c)

To 3,247 g Of the acidic aqueous sol (III) of tungstic oxide-stannic oxide composite prepared in Example 2, 6,990 g of the aqueous sol of stannic oxide-zirconium oxide prepared in the step (b) was added at room temperature under stirring over a period of 20 minutes, and the stirring was further continued for 30 minutes to obtain an aqueous sol having white turbidity. The aqueous sol having white turbidity had a pH of 1.85 and a total content of metal oxides of 2.23 wt %.

Step (d)

10,237 g of the aqueous sol having white turbidity obtained in the step (c) was passed through a column packed with a hydroxyl group type anion exchange resin Amberlite 410 at room temperature to obtain 11,800 g of an aqueous sol of modified stannic oxide-zirconium oxide composite. This sol had a total content of metal oxides of 1.93 wt % and a pH of 8.76. Although it had a colloidal color, the transparency was good.

Step (e)

The aqueous sol of modified stannic oxide-zirconium oxide composite obtained in the step (d) was concentrated at room temperature in the same manner as in Example 3 to obtain 890 g of a highly concentrated aqueous sol of modified stannic oxide-zirconium oxide composite. This sol had a specific gravity of 1,280, a pH of 8.51, a viscosity of 28 Mpa.s and a total content of metal oxides of 25.6 wt %.

Step (f)

To 890 g of the highly concentrated aqueous sol of modified stannic oxide-zirconium oxide composite obtained in the above step (e), 4.5 g of tartaric acid, 6.7 g of diisobutylamine and one drop of a defoaming agent (SN Defoamer 483, San Nopco Limited) were added at room temperature under stirring, and the stirring was conducted for one hour to obtain an adjusted sol having a pH of 8.45.

This adjusted sol was introduced into a rotary evaporator, and while 13 l of methanol was gradually added thereto under reduced pressure at a liquid temperature of not higher than 30° C., water was distilled off from the sol to obtain 743 g of a methanol sol of modified stannic oxide-zirconium oxide composite.

The sol obtained in the above step (f) had a specific gravity of 1.099, a viscosity of 2.5 Mpa.s, a total content of metal oxides of 30.7 wt %, a water content of 0.56 wt %, a pH of 8.16 when mixed with the equal amount by weight of water and a particle size of from 10 to 15 nm as observed by an electron microscope. This sol had a colloidal color and high transparency, and it was stable without any abnormality such as formation of precipitates, white turbidity or an increase of the viscosity even after being left for three months at room temperature. The refractive index of a dried product of this sol was 1.79.

Comparative Example 1

In this Example, an aqueous sol of stannic oxide-zirconium oxide composite having a $ZrO_2/SnO_2$ weight ratio of less than 0.02, was prepared. Using this sol, a modified sol was also prepared.

Step (a)

An aqueous solution of zirconium oxychloride was prepared in the same manner as in Example 3.

To 3,430 g of the aqueous alkaline sol of stannic oxide prepared in Example 1, 120 g of the above-mentioned aqueous solution of zirconium oxychloride was added at room temperature under stirring, and the stirring was continued for one hour to obtain a mixed solution having a $ZrO_2/SnO_2$ weight ratio of 0,012 and a pH of 7.20.

Step (b)

The mixed solution prepared in the step (a) was heated at 85° C. for 3 hours under stirring to obtain 3,550 g of an aqueous sol of stannic oxide-zirconium oxide composite. This sol had a $SnO_2$ content of 2.85 wt %, a $ZrO_2$ content of 0,034 wt % and a pH of 7.07.

Step (c)

To 1,850 g of the acidic aqueous sol (III) of tungstic oxide-stannic oxide composite prepared in Example 2, 3,550 g of the aqueous sol of stannic oxide-zirconium oxide composite prepared in the step (b) was added at room temperature under stirring over a period of 20 minutes, and the stirring was continued for further 30 minutes to obtain an aqueous sol having white turbidity. This aqueous sol having white turbidity had a pH of 6.12 and a total content of metal oxides of 2.45 wt %.

Step (d)

5,400 g of the aqueous sol having white turbidity obtained in the step (c) was passed through a column packed with a hydroxyl group type anion exchange resin Amberlite 410 at room temperature to obtain 6,130 g of an aqueous sol of modified Stannic oxide-zirconium oxide composite. This sol had a total content of metal oxides of 2.16 wt % and a pH of 7.42. Although it had a colloidal color, the transparency was good.

Step (e)

The aqueous sol of modified stannic oxide-zirconium oxide composite obtained in the step (d) was concentrated at room temperature in the same manner as in Example 3 to obtain 433 g of a highly concentrated aqueous sol of modified stannic oxide-zirconium oxide composite. This sol had a specific gravity of 1,354, a pH of 6.54, a viscosity of 12 Mpa.s and a total content of metal oxides of 30.6 wt %.

Step (f)

To 433 g of the highly concentrated aqueous sol of modified stannic oxide-zirconium oxide composite obtained in the step (e), 1.3 g of tartaric acid, 2.0 g of diisobutylamine and one drop of a defoaming agent (SN Defoamer 483, San Nopco Limited) were added at room temperature under stirring, and the stirring was continued for one hour to obtain an adjusted sol having a pH of 6.35.

This adjusted sol was introduced into a rotary evaporator, and while 8 l of methanol was gradually added thereto under reduced pressure at a liquid temperature of not higher than 30° C., water was distilled off from the sol to obtain 435 g of a methanol sol of modified stannic oxide-zirconium oxide composite.

The sol obtained in the above step (f) had a specific gravity of 1,106, a pH of 7.60 when mixed with the equal amount by weight of water, a viscosity of 2.0 Mpa.s, a total content of metal oxides of 30.4 wt %, a water content of 1.7 wt % and a particle size of from 10 to 15 nm as observed by an electron microscope. This sol had a colloidal color and high transparency, and it was stable without any abnormality such as formation of precipitates, white turbidity or an increase of the viscosity even after being left for three months at room temperature. The refractive index of a dried product of this sol was 1.77.

Comparative Example 2

To 4,070 g of the aqueous alkaline sol of stannic oxide prepared in Example 1, 9.6 of citric acid, 12.8 g of diisobutylamine and one drop of a defoaming agent (SN Defoamer 483, San Nopco Limited) were added under stirring, and the stirring was continued for 30 minutes to obtain a sol having a pH of 7.80 and a $SnO_2$ content of 2.93 wt %. This sol had a colloidal color, but the transparency was good.

This sol was introduced into a rotary evaporator and concentrated under reduced pressure at a temperature of not higher than 30° C. to obtain 600 g of a highly concentrated aqueous sol of stannic oxide. This sol had a specific gravity of 1,215, a pH of 7.52, a viscosity of 6.0 Mpa.s and a $SnO_2$ content of 20.0 wt %.

This highly concentrated aqueous sol of stannic oxide was introduced into a rotary evaporator, and while 10 l of methanol was gradually added thereto under reduced pressure at a liquid temperature of not higher than 30° C., water was distilled off from the sol to obtain 393 g of a methanol sol of stannic oxide. This sol had a specific gravity of 1,122, a pH of 7.26 when mixed with the equal amount by weight of water, a viscosity of 5.0 Mpa.s, a $SnO_2$ content of 30.5 wt %, a water content of 2.6 wt % and a particle size of about 10 nm as observed by an electron microscope. This sol had a colloidal color and high transparency, and it was stable without any abnormality such as formation of precipitates, white turbidity or an increase of the viscosity even after being left for three months at room temperature. The refractive index of a dried product of this sol was 1.76.

EXAMPLE 6

A total of five types of sols i.e. three types of methanol sols of modified stannic oxide-zirconium oxide composite obtained in Examples 3 to 5 and two types of methanol sols of modified stannic oxide-zirconium oxide composite obtained in Comparative Examples 1 and 2, were, respectively, coated on Kent paper sheets by means of an applicator in a predetermined thickness, and they were then dried at room temperature to form coating films.

Then, these coating films were irradiated with ultraviolet rays for 30 minutes by means of an UV irradiating apparatus OHD-320CM (manufactured by ORC Company) to test the light resistance. The color changes of the coating films before and after the irradiation with ultraviolet rays were visually observed to evaluate the light resistance. Symbol X indicates a large change i.e. a color change to yellowish brown, and symbol O indicates little change. Symbol Δ indicates a moderate change. The results are shown in the following Table.

| Sol | Light resistance |
| --- | --- |
| Example 3 | O |
| Example 4 | O |
| Example 5 | O |
| Comparative Example 1 | Δ |
| Comparative Example 2 | X |

The above test results indicate that the coating film made from the stannic oxide sol of Comparative Example 2 is susceptible to color change when exposed to ultraviolet rays. Likewise, the coating film made of the sol of Comparative Example 1 wherein the amount of zirconium oxide was not sufficient at the time of preparing the nuclei particles, does not have adequate light resistance. The coating films obtained by using the sols of Examples 3 to 5 of the present invention show good light resistance.

The modified stannic oxide-zirconium oxide composite sol of the present invention is colorless transparent, and its dried coating film shows a refractive index of from about 1.7 to 2.0. Further, both the bond strength and the hardness are high, and the water resistance and the adhesion property are also high. Further, the light resistance, the antistatic property, the heat resistance and the abrasion resistance are also good.

The sol of the present invention is stable at a pH of from about 1 to 9 and has an adequate stability required for an industrial product.

In the sol of the present invention, the colloidal particles are negatively charged, whereby the compatibility with other sol comprising negatively charged colloidal particles is good. For example, it can be stably mixed with a silica sol, an antimony pentoxide sol, an anionic or nonionic surfactant, an aqueous solution of e.g. polyvinyl alcohol, an anionic or nonionic resin emulsion, water glass, an aqueous solution of e.g. aluminum phosphate, or a dispersion such as a hydrolyzed solution of ethyl silicate or a hydrolyzed solution of a silane coupling agent.

The sol of the present invention having such properties, is particularly effective as a component for improving e.g. the refractive index, dyeability, chemical resistance, water resistance, light resistance, weather resistance or abrasion resistance for forming a hard coat film on a plastic lens.

By applying this sol to the surface of e.g. organic fibers, fiber products or paper, it is possible to improve e.g. the flame retardancy, non-slip properties, antistatic properties or dyeability of such materials. Further, this sol is useful as a binder for ceramic fibers, glass fibers or ceramics. It may further be used as mixed into various coating materials or various adhesives to improve the water resistance, chemical resistance, light resistance, weather resistance, abrasion resistance or flame retardancy of such a cured coating film. As other uses, this sol can be used generally as a surface treating agent for e.g. metal materials, ceramics materials, glass materials or plastic materials. Further, it is useful also as a catalyst component.

What is claimed is:

1. A stable sol which comprises colloidal particles of coated stannic oxide-zirconium oxide composite having a particle size of from 4.5 to 60 nm, said colloidal particles consisting essentially of, as nuclei, colloidal particles of stannic oxide-zirconium oxide composite having a particle size of from 4 to 50 nm and having a structure in which colloidal particles of stannic oxide and colloidal particles of zirconium oxide are bonded to each other in a ratio, by weight of these oxides, of from 0.02 to 1.0 as $ZrO_2/SnO_2$, and, as a coating on the surface of the nuclei, colloidal particles of tungstic oxide-stannic oxide composite having a particles size of from 2 to 7 nm and a $WO_3/SnO_2$ weight ratio of from 0.5 to 100, and which has a total content of metal oxides of from 2 to 50 wt %.

2. The sol according to claim 1, which has a pH of from 1 to 9.

3. The sol according to claim 1, which has a total content of metal oxides of from 10 to 40 wt %.

4. A process for producing a stable sol comprising colloidal particles of coated stannic oxide-zirconium oxide composite as defined in claim 1, which comprises the following steps (a), (b), (c) and (d):

(a) a step of mixing an aqueous sol of stannic oxide containing colloidal particles of stannic oxide having a particle size of from 4 to 50 nm at a concentration of from 0.5 to 50 wt % as the oxide $SnO_2$, and an aqueous solution containing an oxyzirconium salt at a concentration of from 0.5 to 50 wt % as $ZrO_2$, in a weight ratio of from 0.02 to 1.0 as $ZrO_2/SnO_2$ derived therefrom;

(b) a step of heating the mixed solution obtained in the step (a) at a temperature of from 60° to 200° C. for from 0.1 to 50 hours to form an aqueous sol of stannic oxide-zirconium oxide composite having a particle size of from 4.5 to 60 nm;

(c) a step of mixing the aqueous sol of stannic oxide-zirconium oxide composite obtained in the step (b) in an amount of 100 parts by weight, as the sum of $ZrO_2$ and $SnO_2$ contained therein, and a sol of tungstic oxide-stannic oxide composite having a particle size of from 2 to 7 nm and a $WO_3/SnO_2$ weight ratio of from 0.5 to 100, in an amount of from 2 to 100 parts by weight, as the sum of $WO_3$ and $SnO_2$ contained therein, at a temperature of from 0° to 100° C. to form an aqueous sol of coated stannic oxide-zirconium oxide composite having a particle size of from 4.5 to 60 nm; and (d) a step of contacting the aqueous sol of coated stannic oxide-zirconium oxide composite obtained in the step (c) to an anion exchanger to remove anions present in said sol.

5. The process according to claim 4, wherein the concentration of stannic oxide in the aqueous sol used in the step (a) is from 1 to 30 wt %.

6. The process according to claim 4, wherein the concentration of the aqueous solution of an oxyzirconium salt used in the step (a) is from 0.5 to 30 wt %.

7. The process according to claim 4, wherein the mixing of the aqueous sol of stannic oxide and the aqueous solution of an oxyzirconium salt in the step (a) is conducted at a temperature of from 0° to 100° C. under stirring.

8. The process according to claim 4, wherein the total content of $ZrO_2$ and $SnO_2$ in the solution after mixing the aqueous sol of stannic oxide and the aqueous solution of an oxyzirconium salt in the step (a) is from 0.5 to 30 wt %.

9. The process according to claim 4, wherein the concentration of the sol of tungstic oxide-stannic oxide composite used in the step (c) is at least 1 wt %.

10. The process according to claim 4, wherein the liquid temperature at the time of mixing the sol of stannic oxide-zirconium oxide composite and the sol of tungstic oxide-stannic oxide composite in the step (c) is not higher than 100° C.

11. The process according to claim 4, wherein the concentration of the sol at the time of contacting the sol obtained in the step (c) to the anion exchanger in the step (d) is from 1 to 10 wt %.

12. The process according to claim 4, wherein the liquid temperature at the time of contacting the sol obtained in the step (c) to the anion exchanger in the step (d) is not higher than 100° C.

13. The process according to claim 4, which includes a further step (e) of concentrating the sol obtained in the step (d) to a concentration of not higher than 50 wt % by an evaporation method or by an ultrafiltration method.

14. The process according to claim 13, wherein the liquid temperature in the step (e) is maintained at a temperature of not higher than 100° C.

15. The process according to claim 13, which includes a further step (f) of adding at least one member selected from the group consisting of a hydroxide, an amine and an oxycarboxylic acid to the sol obtained in the step (e) to adjust the pH to a level of pH 1 to 9.

16. The process according to claim 15, wherein the liquid temperature in the step (f) is maintained at a temperature of not higher than 100° C.

17. The process according to claim 15, wherein the hydroxide used in the step (f) is an alkali metal hydroxide and/or ammonium hydroxide.

18. The process according to claim 15, wherein the amine used in the step (f) is diisobutylamine.

19. The process according to claim 15, wherein the oxycarboxylic acid used in the step (f) is tartaric acid.

20. The process according to claim 15, which includes a further step (g) of substituting the aqueous medium of the aqueous sol obtained in the step (d), (e) or (f) by a hydrophilic organic solvent by a distillation method or by an ultrafiltration method, to obtain an organosol.

21. The process according to claim 20, wherein the liquid temperature in the step (g) is maintained at a temperature of not higher than 100° C.

22. The process according to claim 20, wherein the hydrophilic organic solvent used in the step (g) is a single member or a mixture of at least two members selected from the group consisting of an alcohol, an amide and a glycol.

23. The process according to claim 22, wherein the alcohol used as the hydrophilic organic solvent in the step (g) is at least one member selected from the group consisting of methyl alcohol, ethyl alcohol, isopropyl alcohol.

24. The process according to claim 22, wherein the amide as the hydrophilic organic solvent used in the step (g) is N,N'-dimethylacetamide and/or N-methyl-2-pyrrolidone.

25. The process according to claim 22, wherein the glycol as the hydrophilic organic solvent used in the step (g) is ethyl cellosolve and/or ethylene glycol.

\* \* \* \* \*